United States Patent [19]
Runck et al.

[11] 3,779,708
[45] Dec. 18, 1973

[54] METHOD AND MEANS FOR DETERMINING OXYHEMOGLOBIN ASSOCIATION AND DISSOCIATION CURVES OF WHOLE BLOOD OR OTHER LIQUIDS

[75] Inventors: Alan H. Runck, Marblehead; Cesare Robert Valeri, Boston, both of Mass.

[73] Assignee: The United States of America as represented by the Secretary of the Navy, Washington, D.C.

[22] Filed: Jan. 31, 1972

[21] Appl. No.: 222,226

[52] U.S. Cl. .............. 23/230 B, 23/253 R, 356/40, 356/41
[51] Int. Cl. .......................................... G01n 33/16
[58] Field of Search .................. 23/230 B, 232, 253; 356/40, 41

[56] References Cited
UNITED STATES PATENTS
| | | | |
|---|---|---|---|
| 1,513,542 | 10/1924 | Flagg | 356/41 |
| 3,296,922 | 1/1967 | Goldberg | 356/40 |
| 3,572,995 | 3/1971 | Martin et al. | 23/230 B |

Primary Examiner—Morris O. Wolk
Assistant Examiner—R. E. Serwin
Attorney—R. S. Sciascia et al.

[57] ABSTRACT

A method of and apparatus for the automated measurement of the oxyhemoglobin association and dissociation curves of whole blood, erythrolysates or other liquids are described. The samples to be measured are studied in an environment of constant hydrogen ion concentration (pH) and temperature. They are initially deoxygenated by continuous flow washing and then are exposed to a linear gradient of increasing oxygen concentration to obtain the oxygenation curve. The samples are then oxygenated by continuous flow washing and next are exposed to a linear gradient of decreasing oxygen concentration to obtain the deoxygenation curve. The percentage of oxygen saturation and the oxygen tension of the sample are continuously determined substantially instantaneously by colorimetric analysis using indigo carmine reagent, to give the final oxygen association-dissociation curves.

31 Claims, 9 Drawing Figures

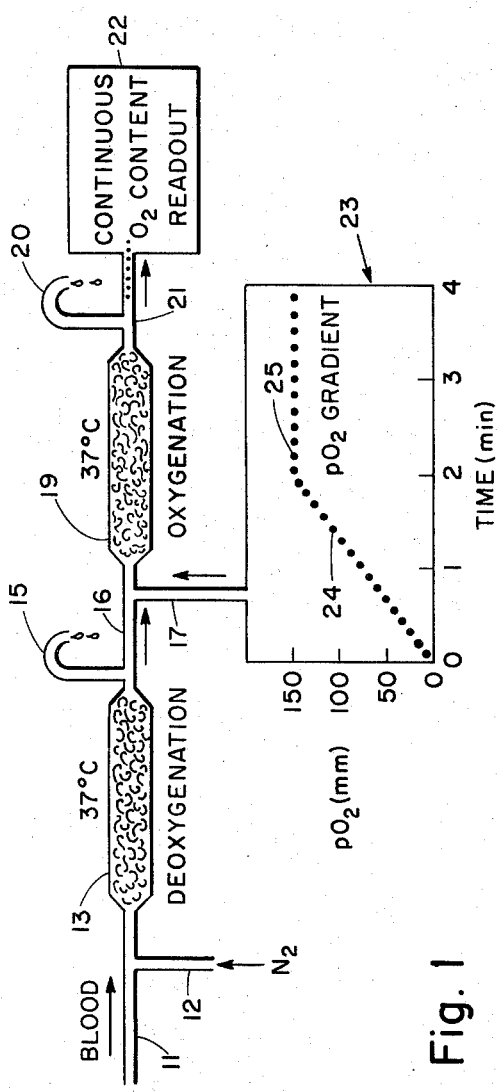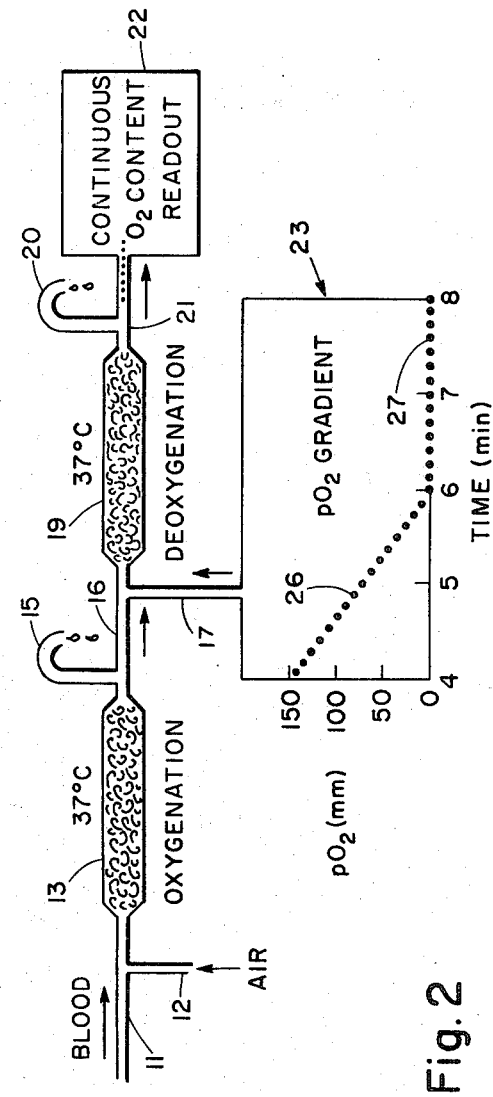
Fig. 1
Fig. 2

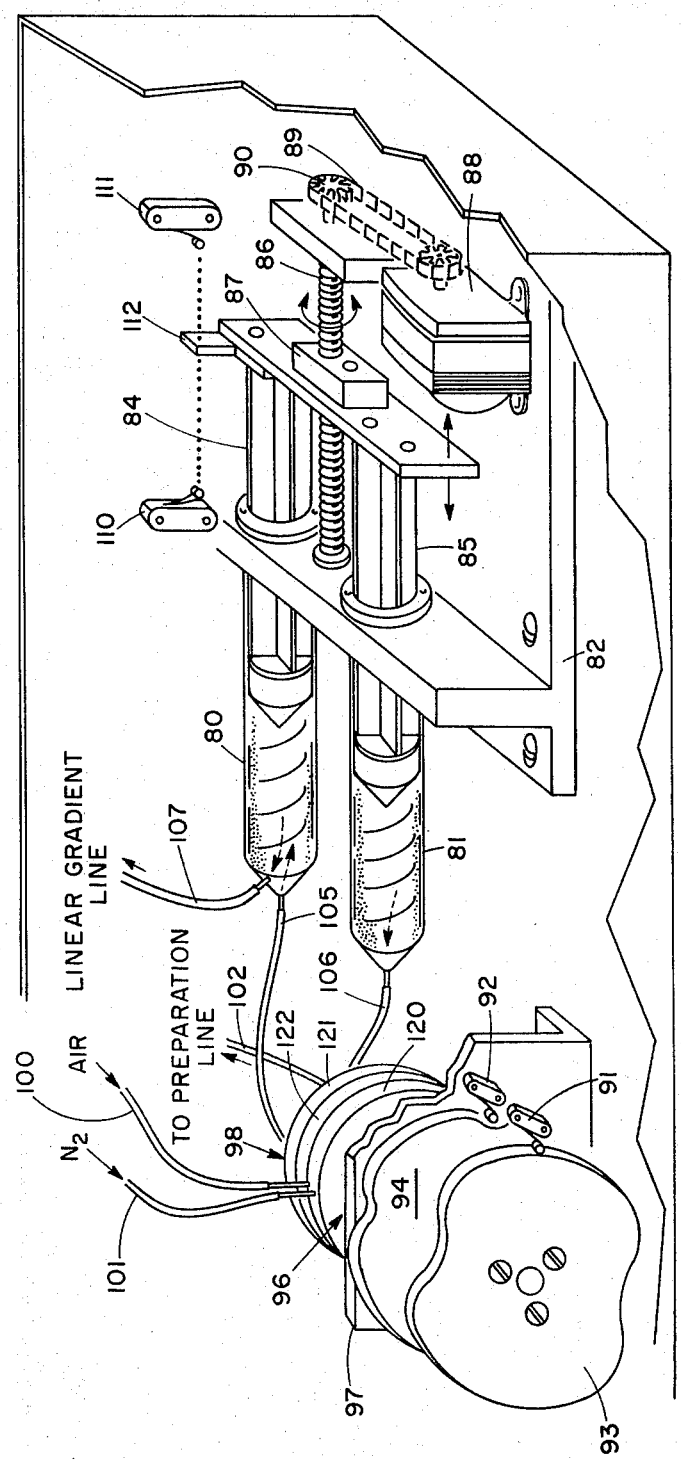

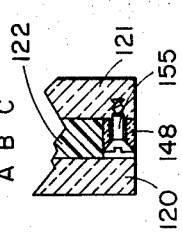
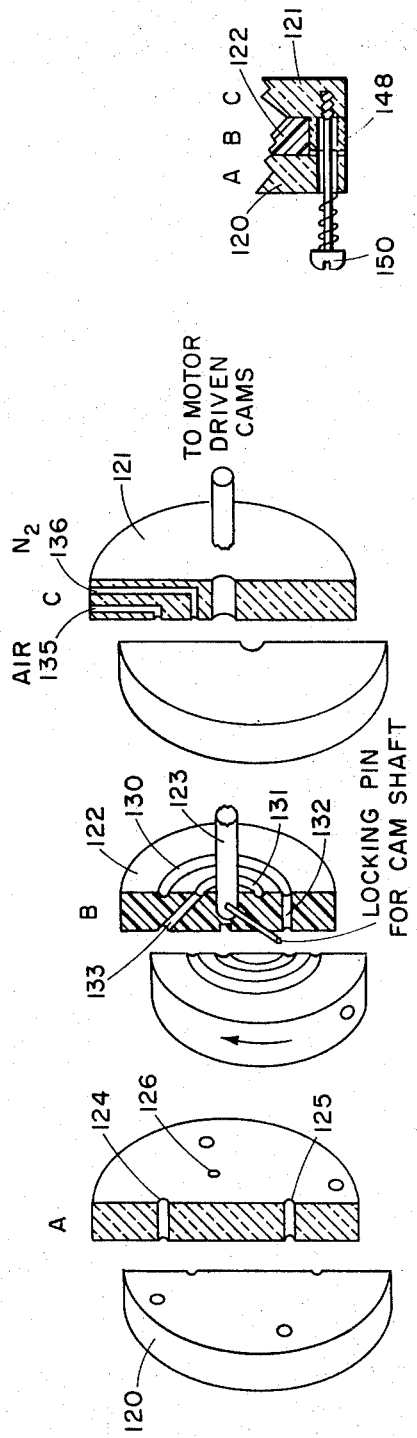
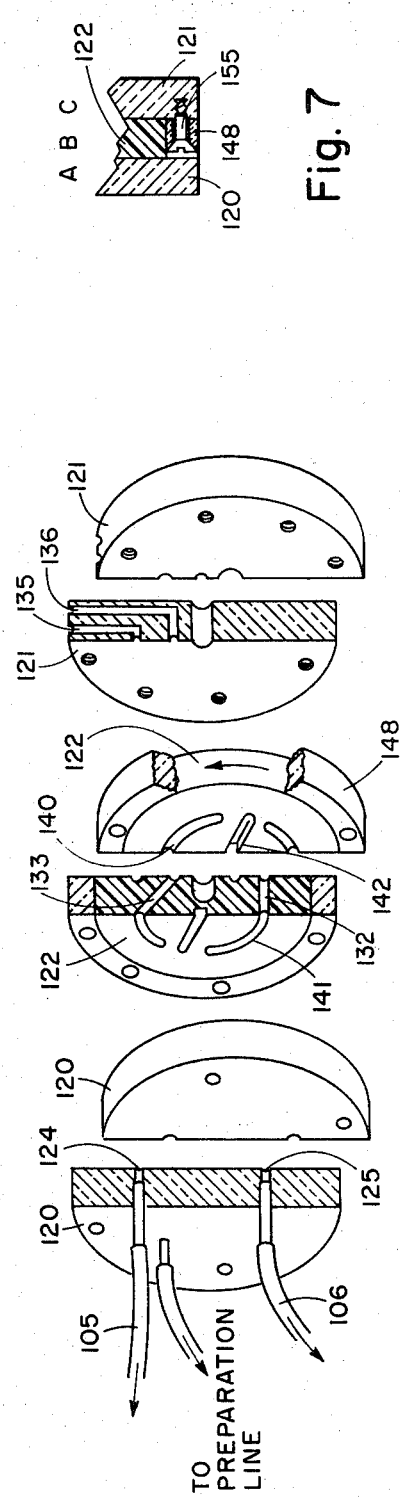

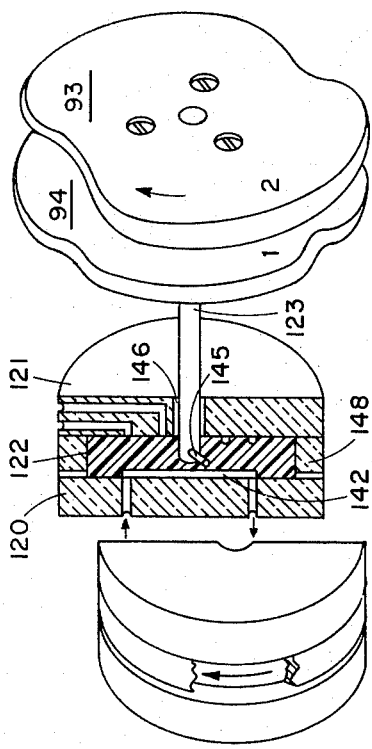
Fig. 5a
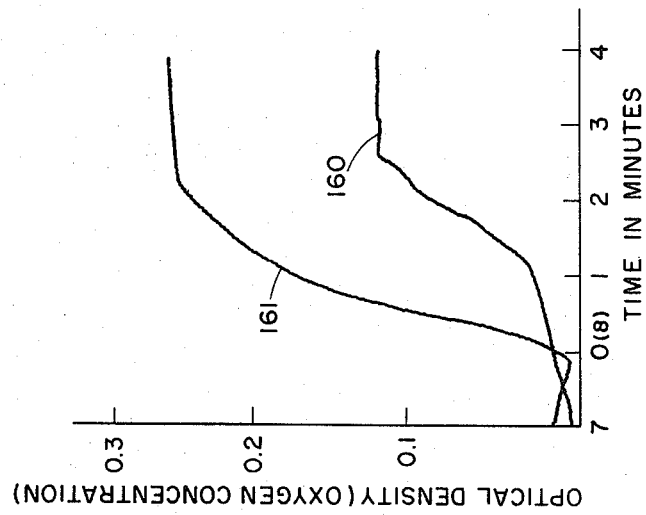
Fig. 8
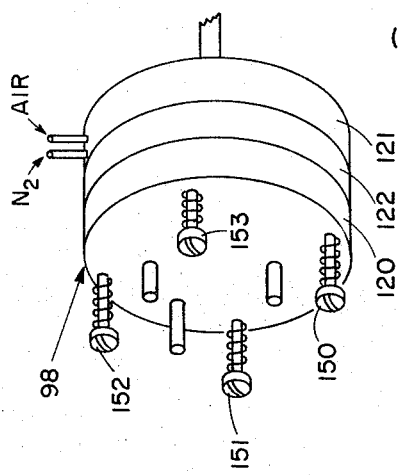

ent of a patient or for other undelayed analysis. Knowledge of the oxyhemoglobin dissociation curve of a person's blood can thus be obtained at present only after several hours of labor for each sample, exclucing the routine use of these methods. It will thus be appreciated that blood functions may be better understood and malfunctions diagnosed insofar as oxygenation and deoxygenation are concerned if the oxygen carrying properties of a person's blood, or more particularly of the red blood cells in the blood, can be determined rapidly and thoroughly

METHOD AND MEANS FOR DETERMINING OXYHEMOGLOBIN ASSOCIATION AND DISSOCIATION CURVES OF WHOLE BLOOD OR OTHER LIQUIDS

The invention described herein may be manufactured and used by or for the Government of the United States of America for governmental purposes without the payment of any royalties thereon or therefor.

The present invention concerns a method of and means for measuring blood-oxygen carrying properties and, more particularly, for determining the relative ability of red cells to absorb and to release oxygen in the body.

The purpose of the blood in the body is to carry sufficient oxygen to satisfy the expected needs of all the tissues in the body. The critical element in this mechanism is the red blood cell and its ability through a very delicate control system to sense the requirements of the body for oxygen and to adapt to these requirements. The response of the red blood cell is reversible in that the red cell has the ability to become saturated with oxygen in the lungs, to transport that oxygen throughout the body and release it to the various tissues, and to again receive oxygen at the lungs — the cycle being repeated every several minutes in the human body.

The ability of the red blood cells to fulfill their function of delivering oxygen to various parts of the body has been related to the shape and position of the oxyhemoglobin dissociation curve, where the total amount of oxygen bound to hemoglobin is measured at varying oxygen tensions, or ambient concentrations. It is not known at the present whether the curve representing oxyhemoglobin association, i.e., acquiring oxygen, is symmetrical to the curve representing oxyhemoglobin dissociation, i.e., surrendering oxygen. In any event, the red cell is uniquely adapted to vary its rate of oxyhemoglobin association and dissociation in relation to the span of activity from sleep to great physical exertion without any known damage to or fatigue to the cells.

The oxyhemoglobin dissociation curve of a person's blood defines the extent to which the blood will bind or contain oxygen under oxygen tensions ranging from 0 mm Hg to 140 mm Hg. This curve is obtained by equilibrating samples of the blood at different oxygen tensions, measuring the percentage of oxygen saturation of the sample and drawing the best line through preferably six measured points. The percentage of oxygen saturation of blood specimens is presently estimated from the measured oxyhemoglobin content of a specimen by visible spectrum techniques or obtained directly by measuring oxygen content before and after saturation of a sample. Two methods are presently used to measure the oxygen content of blood, hemoglobin solutions or erythrolysates. The manometric or direct method is used in most laboratories and is manual and requires thirty minutes of technician time for each determination. A more recent method using a fuel cell for determining oxygen content is also manual but requires only eight minutes of technician time per determination. However, neither method is practical for use in determining the oxygen dissociation curve due to the amount of labor required for the multiple determination of oxygen content needed to construct one curve. Using either method, it is not feasible to have results available in the time needed to permit prompt treatment of a patient or for other undelayed analysis.

The present invention provides a valuable technique and apparatus for substantially instantaneously determining these properties of a patient's red blood cells. Oxygen content is measured by a colorimetric method using indigo carmine reagent and a commercially available AutoAnalyzer, resulting in an automatic analysis for determining the oxygen content of red blood cells or hemoglobin solutions. The oxyhemoglobin association and dissociation curves are then determined by relating the measured oxygen content and percentage saturation values with the known oxygen tension of the sample.

Accordingly, it is an object of the present invention to provide a novel method of and means for substantially instantaneously determining some of the critical properties of red blood cells.

It is another object of this invention to provide an automated system for rapidly determining the ability of red blood cells to oxygenate and deoxygenate.

It is a further object of this invention to provide a method of and means for automating all the chemical, mixing, and colorimetric tests involved in a particular analysis of blood.

Other objects, advantages and novel features of the invention will become apparent from the following detailed description thereof when considered in conjunction with the accompanying drawings in which like numerals represent like parts throughout and wherein:

FIG. 1 is the schematic diagram illustrating the method of the invention for determining the oxygen uptake curve of a given sample of blood;

FIG. 2 is a schematic diagram illustrating the method of determining the oxygen release curve for the sample of blood used in the method of FIG. 1;

FIG. 4 is a perspective view of apparatus for producing the $pO_2$ gradients shown in FIG. 1 and FIG. 2;

FIGS. 5 and 5a are perspective views of rotary valve disk and cam arrangements used in the embodiment shown in FIG. 4;

FIG. 6 is a sectional view partly cut away showing a partial assembly of the rotary valve disks;

FIG. 7 is a sectional view partly cut away showing a further assembly of the rotary valve disks; and FIG. 8 is a graph of the data derived from the invention.

Figure 3:
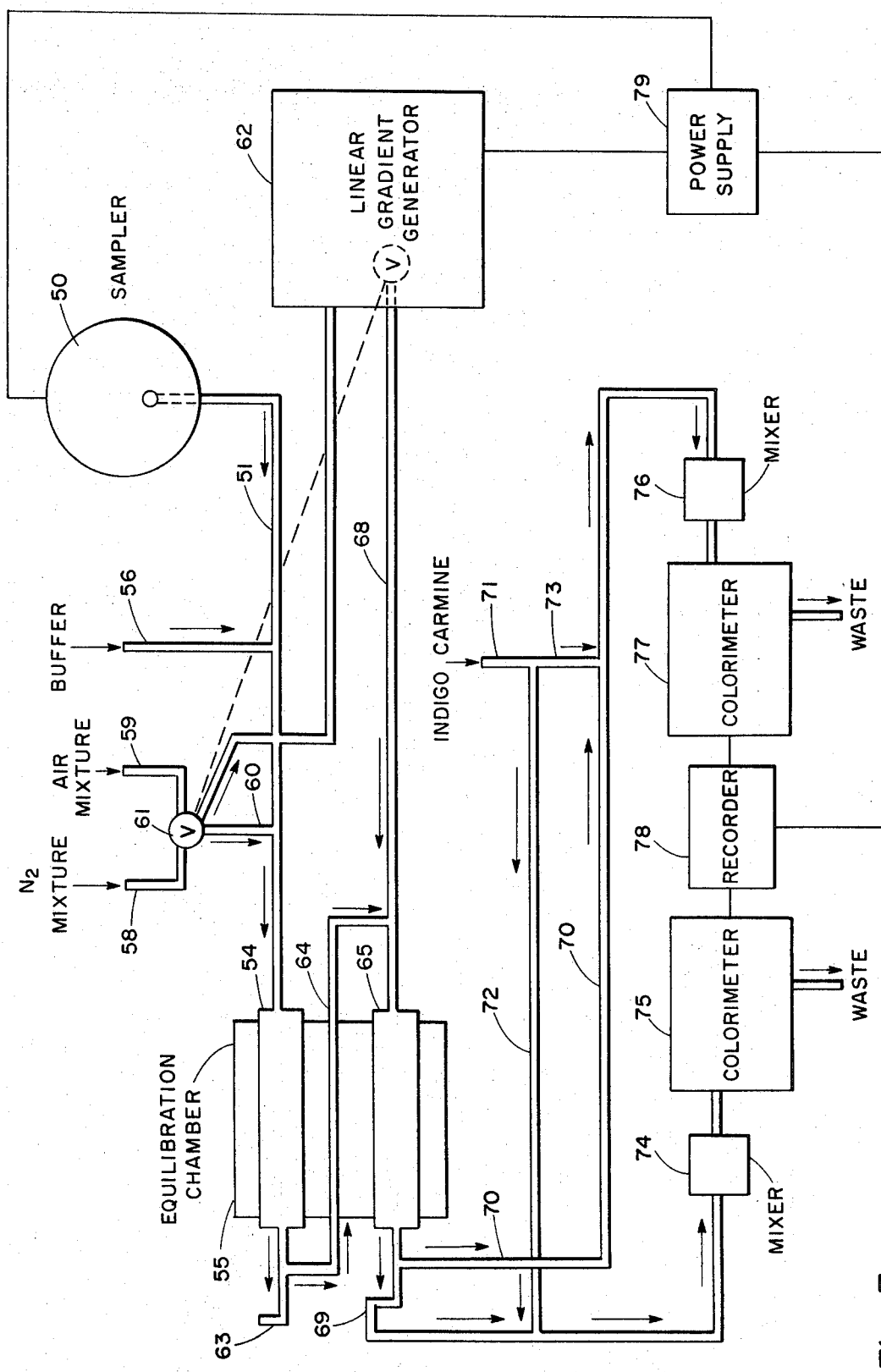
FIG. 3 is a schematic diagram of a method of continually mixing volumes of blood samples and gas atmosphere for colorimetric analysis.

Referring to FIGS. 1 and 2, the method of the invention in continually processing a given blood sample through both deoxygenation and oxygenation phases is shown wherein a blood sample is introduced through line 11 and a gas sample of nitrogen is introduced through a line 12. Mixing occurs between the juncture of lines 11 and 12 and an equilibration tube 13 which preferably is maintained at a constant temperature of 37° C. Equilibration in this context constitutes a foaming procedure to place the blood in intimate contact with the gas, allowing rapid and complete equilibration. This process is a laboratory approximation of equilibration of blood in the lungs across a thin membrane, which process cannot be tecnnically accomplished in the present state of the art. After equilibration, all gas and some excess liquid are decanted off via a line 15 leaving only an oxygen free liquid blood suspension to flow through a line 16 to the oxygenation phase. At the next juncture, a line 17 introduces oxygen in known concentrations into the deoxygenated blood with mixing occurring at the juncture of lines 16 and 17 and between the juncture and a second equilibration tube 19 which performs a similar function to that of equilibration tube 13. After traversing equilibration tube 19, all gas and some excessive liquid are decanted through a line 20 after which incremental parts of the remaining blood having increasing oxygen content are introduced through a line section 21 into an indigo carmine test indicator 22 which may be a unit such as the AutoAnalyzer produced by the Technicon Company, Inc., Saw Mill River Road, Chauncey, N.Y. The indigo carmine readout of the blood drawn through line 22 is continuously recorded on a strip chart recorder referred to infra. The graphical presentation illustrated by gradient 24 indicates the oxygen tension of the gas which the blood in equilibration tube 19 is in contact with, as a function of time during the automated test. The oxygen tension of the blood increases linearly with time during the first two minutes of the test, 24, and is held constant at 150 mm during the second two minutes of the test as indicated at 25. Deoxygenation or the ability of the blood to be relieved of its oxygen is accomplished by the method illustrated in FIG. 2 wherein blood which is more of the same sample which was processed according to FIG. 1 also is introduced through line 11 and is mixed with a gas comprising air which is introduced through line 12. Mixing, as before, occurs at the juncture of lines 11 and 12 and, in any event, before the blood reaches equilibration tube 13 where the blood again is in intimate contact with the equilibrating gases, to allow rapid and complete equilibration. Again all gases and excess liquids are decanted off through line 15 so that only liquid blood will now flow through line 16 in a condition of oxygen saturation. At the next juncture, line 17 introduces oxygen in known concentrations into the oxygenated blood with mixing occurring at the juncture of lines 16 and 17. The mixture then passes through equilibration tube 19 which performs a similar function to that of equilibration tube 13. After traversing equilibration tube 19, all gas and some liquid are decanted through line 20 after which incremental parts of the remaining blood having decreasing oxygen content are introduced through line section 21 into the indigo carmine test indicator 22. The indigo carmine readout of the blood drawn through line 21 is continuously recorded on a strip chart recorder. The graphical presentation illustrated by gradient 26 indicates the oxygen tension of the gas which the blood in equilibration tube 19 is in contact with, as a function of time during the automated test. The oxygen tension of the gas in contact with the blood in tube 19 decreases linearly with time during the third two minutes of the test, 26, and is held constant at 0 mm during the fourth two minutes of the test as indicated at 27.

In FIG. 2, the system for continually mixing volumes of blood sample and gas atmosphere by the use of an AutoAnalyzer Proportioning Pump made by the Technicon Company, Inc., supra, is shown. The oxygen content of the samples after exposure to a gas atmosphere is continuously determined by the application of an established method for the colorimetric determination of oxygen to the AutoAnalyzer. The time of exposure of a sample to a gas atmosphere, the composition of the gas atmosphere at a given point in time, and the reference points on a recorder relating oxygen content to the level of oxygen tension are produced by a linear gradient generator which will be described in detail infra. In the present method and apparatus therefor which is shown in FIG. 3 and which is applicable successively to FIGS. 1 and 2, a blood sample is selected by rotation of a sampler rack 50. A portion of the sample then is transported through a line 51 to an equilibration tube 54 in an equilibration chamber 55 with a selected amount of buffer being introduced into the sample portion through a line 56. The combination of buffer and sample is mixed with a mixture of either nitrogen gas or air, corresponding to FIG. 1 or FIG. 2, respectively, which are supplied through lines 58 and 59, at the juncture of a line 60 and line 51. The appropriate mixture is determined by the position of a valve 61 which is mechanically and electrically operated by a linear gradient generator 62 which is shown in detail in FIG. 4. The properly mixed sample is the debubbled in tap 63 where gas and some liquid are removed and the remaining liquid portion of the sample is then transported through a line 64 to a second equilibration tube 65. A controlled concentration of oxygen is added to the sample from linear gradient generator 62 through a line 68. The amounts of nitrogen and air which are mixed with the blood are determined by linear gradient generator 62. The sample is then equilibrated again in tube 65 and all of the gas and some liquid are removed through a line 69. From tube 65, the remaining liquid portion of the sample is carried through a line 70. Indigo carmine reagent is added to both the gaseous and liquid portions in lines 69 and 70 through lines 71, 72 and 73. The gaseous portion and indigo carmine reagent are mixed in a mixer 74 and the oxygen tension therein is obtained by a colorimeter 75. The liquid portion and indigo carmine reagent are mixed in a mixer 76 and the oxygen content of the flow of liquid is obtained by a colorimeter 77. The outputs of both colorimeters are recorded in a recorder 78. Power for all components is received from a power supply 79.

In FIG. 4, a linear gradient generator is shown in detail in perspective and includes a pair of identical syringes 80 and 81 which are supported by a frame 82 in such a manner as to permit insertion and withdrawal of a pair of associated plungers 84 and 85, respectively, within the syringes in response to movement of a screw 86 through a non-rotatable nut 87. A motor 88 is connected by a chain 89 to a sprocket wheel 90 mounted on the end of the screw 86. Motor 88 is connected by conventional means, not shown, to a power source, also not shown, in series with a pair of switches 91 and 92 which are operated by a pair of cams 93 and 94, respectively. A second motor 96, not visible, is installed between a bracket 97 and a rotary valve 98 to provide controlled rotation of cams 93 and 94 and the movable element of rotary valve 98. Supply lines 100 and 101 supply air and nitrogen gas, respectively, to rotary valve 98, while a preparation line 102 also is connected to rotary valve 98 to provide a continuous supply of air or nitrogen to oxygenate or deoxygenate the blood in equilibration tube 13 in FIG. 1. Rotary valve 98 is connected by internal passages, shown in FIG. 5, and by tubes 105 and 106 to syringes 80 and 81, respectively, and syringe 80 is connected to the linear gradient line which is always connected to equilibration chamber 19 in FIG. 1 and FIG. 2 by tube 107. Switches 110 and 111 are mounted on the cabinet housing the equipment to reverse the direction of motor 88 when a tab 112 which is secured to nut 87 and plungers 84 and 85 reaches the extremes of travel in opposite horizontal directions.

Rotary valve 98 is shown in detail in FIGS. 5 and 5a and comprises a pair of outer stationary disks 120 and 121 and an inner rotary disk 122 which is connected by a shaft 123 to cams 93 and 94. Stationary disk 120 is shown in sectioned perspective at the upper left of FIG. 5 and is provided with transverse passages 124, 125 and 126 which communicate to the interior of disk 122. Passage 134 is connected to tube 105, passage 125 is connected to tube 106 and passage 126 is connected to preparation line 102. In the upper center of FIG. 5, disk 122 is shown in sectioned perspective and includes on its right face annular grooves 130 and 131, which grooves are connected to left face grooves by passages 132 and 133, respectively. Disk 121 is shown with its right or outer face open to view in the upper right corner of FIG. 5 and contains radially extending passages 135 and 136 which become axially extending to register respectively with grooves 130 and 131 of rotary disk 122. In the lower line of FIG. 5, outer disk 120 is shown with its left face open to view in section and illustrates the manner in which tubes 105 and 106 and preparation line 102 communicate therewith. The left face of disk 122 is shown in sectioned perspective in this line, illustrating the discontinuous annular grooves which are formed on that face, namely, upper and lower grooves 140 and 141 a straight horizontal groove 142. Adjacent this view, the left face of disk 121 is shown in sectioned perspective illustrating again passages 135 and 136. In FIG. 5a the three disks 120, 121 and 122 are shown assembled in perspective with rotary disk 122 rotated 90° clockwise from the position in which it is shown in the center of FIG. 5. In the right of FIG. 5a, shaft 123 which is connected to both of cams 93 and 94 is shown terminating in disk 122, being secured thereto by pin 145. Disk 121 is cut away to a greater diameter as indicated at 146 to permit free rotation of shaft 123 therein. Rotary disk 122 is further provided with an outer stationary ring 148 which serves to position the disk within the confines of the ring and is spaced from the disk a suffient amount, not shown, to permit free rotation of disk 122 with respect to ring 148. The outer disks and the stationary ring are mounted together by spring-load screws 150-153 as shown in FIG. 6 while the stationary ring and disk 121 are secured together by four internally disposed screws, one of which is shown at 155.

In performing the methods of the invention through operation of the apparatus shown and described, certain preliminary steps and solutions are required. The indigo carmine reagent is prepared in a solution comprising 0.1 percent indigo carmine, 1.0 percent dextrose, 1.0 percent potassium carbonate, 0.28 percent potassium hydroxide and 1.0 percent Triton X-100. This solution is heated to 70° C and stored preferably in a polyethylene bottle under 1 inch of mineral oil. The albumin buffer used in connection with the device comprises a solution containing 0.5 percent albumin, 0.9 percent sodium chloride, and 0.100 percent disodium phosphate, $Na_2HPO_4$. This solution is adjusted to a pH of 7.4 by the addition of 1.0 N hydrochloric acid.

The linear oxygen gradient may be established by any suitable commercially available device which performs in the manner described by S. P. Bessman in an article on hydrostatic gradient apparatus in Analytical Biochemistry, Vol. 18, p. 256, 1967. The Bessman article describes a double reservoir system which produces a linear change in concentration of a component against time. Two 50 ml polypropylene syringes, 80 and 81 in FIG. 4, are used as reservoirs and are connected to capacitor motor 88 via a screw and nut arrangement so that the reservoirs will empty and fill simultaneously at a constant rate. The The syringes are selectively interconnected to be alternately filled with primarily nitrogen gas or air at the beginning of each cycle, resulting in the desired continuous flow in which oxygen tension changes linearly from 0 mm to 140 mm mercury, and then from 140 mm to 0 mm mercury. The air and nitrogen requirements preferably are supplied from compressed gas cylinders which are regulated to deliver one pound per square inch of pressure.

The step of equilibration is accomplished by mixing one volume of red cell suspension with five volumes of albumin buffer and 40 volumes of gas atmosphere. The mixture is equilibrated, i.e., foamed to assure complete exposure of the blood to the gas, by passing it through glass equilibration tubes 13 and 19 preferably having an inside diameter of 6 mm and a length of 30 cm. Tubes 13 and 19 in FIGS. 1 and 2 correspond to tubes 54 and 65 in FIG. 3. The equilibration tubes used in the apparatus are maintained in an equilibration chamber as indicated in FIG. 3 whose temperature is maintained at 37°. The time of transmission or transport of the suspension through each equilibration tube preferably is 20 seconds. This movement of fluid is controlled by the use of an AutoAnalyzer Proportioning Pump made by the Technicon Company, Inc., supra, through compression of appropriate lines.

Referring now to FIG. 4 as the most appropriate figure to describe operation, syringes 80 and 81 are empty initially with plungers 84 and 85 disposed in the extreme left positions from those shown in FIG. 4. Through passages 135 and 136, grooves 140 and 141, passages 133 and 132, grooves 131 and 130, passages 124, 125 and 126, and tubes 105 and 106 have previously been filled with gas mixtures appropriate for the first phase of operation. Tubes 105 and 106 are connected, respectively, to $N_2$ inlet 136 and air inlet 135 through appropriate passages in rotary valve 98. Motor 88 is now actuated to cause the plungers to be drawn to the right over a first 2-minute time interval in which syringe 80 is filled with the $N_2$ mixture and syringe 81 is filled with the air mixture. At the end of travel to the right of plungers 84 and 85, tab 112 actuates switch 111 which in turn actuates motor 96 rotating disk 122 and cams 93 and 94 90° clockwise after which cam 94 actuates switch 92, causing motor 96 to stop. This rotation of cam 93 actuates switch 91 which reverses the direction of rotation of motor 88. This rotation of disk 122 aligns passages 124 and 125 with passage 142, in effect connecting syringe 81 directly to syringe 80. Motor 88 now moves the plungers to the left by counterclockwise rotation of screw 86 which movement forces the air in syringe 81 to enter and beome mixed with the nitrogen in syringe 80, a changing mixture of $N_2$ and air in syringe 80 being forced out through tube 107. This movement of the plungers, to provide a selective gradient of $O_2$ tension, is also accomplished evenly over a second 2-minute period so that the gas mixture exiting through line 107 to line 68 in FIG. 3 will contain a linearly increasing amount of oxygen conforming to gradient 24 in FIG. 1. This changing concentration of oxygen is introduced into the system through tube 17 in FIG. 1 after the blood has been equilibrated in chamber 13 so that the oxygen becomes mixed with deoxygenated blood before both enter equilibration chamber 19. The blood exiting chamber 19 thus has a linearly increasing oxygen content which is detected in continuous $O_2$ content readout 22. This readout, therefore, indicates the amount of oxygen which the blood has been able to absorb from the linearly increasing $O_2$ concentration to which it has been subjected at the juncture of tubes 16 and 17. The readout from 22 is then presented in graph form as curve 160 in FIG. 8 while the oxygen tension of the sample measured in colorimeter 75 is presented in curve 161.

The next or third 2-minute operation interval begins with syringes 80 and 81 empty and when tab 112 contacts swtich 110. At this time, switch 110 actuates synchronous motor 96 which rotates cam 93 90° further clockwise after which cam 94 actuates switch 92, causing motor 96 to stop. At this position of cam 93, reversing switch 91 actuates capacitor motor 88 causing that motor to reverse and to thereafter move plungers 84 and 85 in the opposite direction from their previous movement, filling the syringes in the following manner. Inlet tubes 105 and 106 of respective syringes are now connected in reverse relation to the condition in the first phase through grooves 140 and 141, i.e., 105 is now connected to inlet 135 (air mixture) while 106 is connected to inlet 136 ($N_2$ mixture). In this condition, the syringes are filled again during a 2-minute interval but with opposite mixutes as their respective plungers are moved to the right in FIG. 4. At the end of travel of the plungers in this phase, tab 112 again will contact switch 111, actuating motor 96 which will rotate shaft 123 and cams 93 and 94 a further 90° increment clockwise. This rotation of shaft 124 will cause cam 93 to actuate switch 91 which in turn will cause motor 88 to reverse direction. In this condition, tubes 105 and 106 are again connected to passage 142 through passages 124 and 125, setting up the fourth phase of operation.

In the fourth phase, the plungers again move to the left forcing the nitrogen mixture in syringe 81 into syringe 80 through tubes 106 and 105, the tube mixtures being combined in tube 80 and the combination being forced out through tube 107 to line 68 in FIG. 3. The mixture now passing through tube 107 is one of linearly decreasing oxygen content which is introduced through tube 17 and mixed at the juncture of tubes 16 and 17 will fully equilibrate with blood flowing from equilibration tube 13. The flow of blood which then passes through equilibration tube 7 will have a decreasing oxygen tension with time as indicated by gradient 26 in graph 28. The actual oxygen content of the blood leaving equilibration tube 19 is then measured and detected in $O_2$ readout 22 and curves representing changing oxygen content and total oxygen are produced as indicated in FIG. 8.

With the completion of the emptying of syringes 80 and 81 in the fourth phase, a full cycle in the operation of the device will have been completed. The fourth 90° rotation of cam 93 and disk 122 places these components in the position they were in at the start of operation, that is, passages 124 and 125 are now again directly connected through groove 142. The composition of the effluent from tube 107 during the third phase remained at an oxygen tension of 150 mm mercury, the oxygen tension thereafter decreasing linearly from 150 mm to 0 mm mercury during the fourth phase. At the end of the fourth phase, the entire cycle is repeated starting with the first phase. The time interval for each period is governed by the desired length of plunger travel, and can be changed by changing the location microswitch 111.

The gas supply to equilibration tube 13 in FIG. 1 and FIG. 2 is controlled entirely by rotary valve 98. During the oxygenation phase which spans phases 1 and 2, rotary valve 98 feeds a nitrogen mixture to tube 12 while during the deoxygenation phase which covers operative phases 3 and 4, the valve supplies an air mixture to tube 12.

Equilibration tubes 13 and 19 preferably are 6 mm i.d. glass tubes 30 cm. in length with the tips drawn to 1 mm i.d. Both equilibration tubes are immersed in a water bath in equilibration chamber 55 as indicated in FIG. 3 which is maintained at 37° C by a conventional thermistor monitored solid state temperature control circuit.

The outflow through tube 107 is prevented from being vented directly to the atmosphere by a pressure release valve therein, not shown, which valve operates to minimize any pressure differential through the system while insuring the reproducible generation of a linear gas concentration gradient.

Through one complete cycle of operation, which takes eight minutes, a single complex oxygen association-dissociation curve detecting the oxygen uptake and release properties of a sample is measured. Therefore, in an 8-hour day, the oxygen uptake and release properties of 60 or more separate samples may be determined. It is also possible to process a greater number of samples by easily adjusting the speed of the assay sequence, through adjusting the position of switch 111.

In summary, during the assay for each sample, a portion of the sample is continuously removed at a constant rate and mixed with a constant flow of gas to result in a continuously-flowing stream of foam flowing at a constant rate. The foam is allowed to traverse the length of an equilibration tube held at a constant temperature. After traveling to the end of the equilibration tube, a portion of the liquid phase of the foam is continuously removed for further manipulation. The purpose of the entire process up to this point is to prepare the sample for the actual test; that is, in the first equilibration tube, the sample is either mixed with gas devoid of oxygen to remove any existing oxygen on the sample, or containing oxygen to fully oxygenate the sample.

The actual test is carried out on portions of the sample continuously being removed after passing through the first equilibration tube 13. These continuously-flowing portions of the sample, which are now either initially deoxygenated or oxygenated, are mixed with a constant flow of gas linearly increasing in oxygen tension (first 2 minutes of assay period) or decreasing in oxygen tension (third 2 minutes) and allowed to equilibrate in the second equilibration tube 19 in FIG. 2. After traveling to the end of the second equilibration tube, a portion of the liquid phase of the foam is removed for measurement of total oxygen content, and a portion of the gas phase of the foam is removed for measurement of oxygen tension. The colorimetric analysis method used in determining oxygen levels for both the liquid and gaseous phases is the same. Oxygen from a particular stream of blood or gas reacts with a stream of indigo carmine reagent, causing it to develop a color intensity proportional to the amount of oxygen added. The color intensity is measured in colorimeters 75 and 77 and recorded by colorimeter-recorder 78. The end result is a continuous recorder tracing of the oxygen content of the sample, curve 160 in FIG. 8, during deoxygenation and oxygenation, as well as a continuous recorder tracing of the oxygen tension of the sample, curve 161 in FIG. 8. The percentage of oxygen saturation of the specimen at various oxygen tensions and the final oxygen association-dissociation curves are calculated from this data.

There is thus provided in the present invention a method of and an apparatus for measuring the capacity of blood samples to absorb and release oxygen. The curves obtained of oxygen association and dissociation are done automatically on multiple samples of whole blood, hemoglobin solutions, erythrolysates, or other liquids. Curves representing the ability of blood to release oxygen, the ability of blood to acquire oxygen and the ability to measure differences in the rate of oxygen uptake and release may be determined at rate of 40 or more curves per hour by a single apparatus. The method and apparatus are relatively simple, and the apparatus is constructed of inexpensive components with perhaps the exception of the rotary valve, and is relatively simple to operate. A laboratory having but one of these devices may perform a great many times the number of oxygen release and oxygen affinity curves over that possible through the manual determinations which are now the only means available for measuring these properties of blood. When the device is used in connection with a patient having deficiencies in the ability of his blood to acquire and release oxygen, complete results of the blood properties discussed herein may be obtained in a matter of minutes so that corrective measures may be taken which in the past were impractical due to the exceedingly long time required to obtain the data.

Obviously, many modifications and variations of the present invention are possible in the light of the above teachings. For example, the sensitivity of the assays may be altered by increasing or decreasing the ratio of specimen volume to the quantity of indigo carmine reagent mixed with it. Also, the sensitivity of the oxyhemoglobin dissociation curve may be increased by using compressed gas containing less than 20 percent oxygen instead of room air in the linear gradient generator. The rates of assay may be varied by simply changing the rate of change in oxygen tension, that is, the position of switch 111.

What is claimed is:

1. A method of determining the oxygen association of whole blood, lysed erythrocytes, or other liquids during continuous flow thereof comprising:
   deoxygenating a flowing samle of the blood;
   mixing with the flowing blood sample a gas having a linearly increasing oxygen concentration;
   continuously determining the oxygen content of the flowing blood; and
   recording the oxygen content data so that a graph is obtained which indicates the capability of the blood sample to acquire oxygen.

2. The method of claim 1 wherein a simulated body environment is achieved by equilibrating the blood to its state in the body in appropriate foaming chambers before and after mixing with the oxygen gradient,
   said chambers maintained at a selected temperature and pressure.

3. The method of ciaim 2 wherein the step of successively determining oxygen content is performed optically by use of an oxygen reagent and colorimetric reading means.

4. The method of claim 3 wherein the linearly increasing oxygen supply is obtained by linearly combining a volume of nitrogen gas with an equal volume of air.

5. A method of determining the oxygen dissociation of whole blood, lysed erythrocytes, or other liquids during continuous flow thereof comprising:
   oxygenating the flow of blood to its saturation point;
   mixing with the flow of oxygenated blood a gas having a linearly decreasing oxygen content; and
   continuously determining the oxygen content of the flow of blood so that a graph of oxygen content may be obtained which exemplifies the capability of the blood sample to release oxygen.

6. The method of claim 5 wherein the simulated body environment is achieved by equilibrating the blood to its state in the body in appropriate foaming chambers before and after mixing with the oxygen gradient,
   said chambers maintained at a selected temperature and pressure.

7. The method of claim 6 wherein the step of successively determining oxygen content is performed optically by use of an oxygen reagent and colorimetric reading means.

8. The method of claim 7 wherein the linearly decreasing oxygen supply is obtained by linearly combining a volume of air with an equal volume of nitrogen gas.

9. The method of claim 8 wherein the total oxygen content of the blood is determined prior to mixing with the linearly decreasing oxygen supply.

10. A method of determining the oxygen dissociation and association curves of whole blood, lysed erythrocytes, or other liquids during continuous flow of samples thereof comprising:
   initiating a confined flow of blood from one of several samples;
   deoxygenating the flowing blood;
   foaming the blood under selected temperature and pressure to equilibrate the blood to its state in the body;
   mixing the flowing blood with a gas containing a linearly increasing gradient of oxygen;
   equilibrating the blood immediately after said mixing with oxygen;
   continuously determining the increasing oxygen content of the blood;
   oxygenating the blood to its maximum oxygen content;

diverting a portion of the sample blood for oxygen content determination;

equilibrating the blood;

mixing the flowing blood with a gas containing a linearly decreasing oxygen gradient;

equilibrating the blood; and continuously determining the decreasing oxygen content of the partial sample of blood.

11. Apparatus for processing, during continuous flow, samples of blood to determine the oxyhemoglobin association and dissociation curves thereof and other properties comprising:

means for initiating and maintaining a confined flow of blood from a selected one of said samples through said apparatus;

an albumin buffer and means for introducing said buffer first into said flow of blood;

linear gradient generating means for generating a flow of gas having alternatively an increasing oxygen gradient and a decreasing oxygen gradient;

a deoxygenating gas mixture and an oxygenating gas mixture and means for introducing said mixtures alternately into said flow of blood and into said linear gradient generating means;

means for equilibrating said blood including a plurality of individual equilibration tubes disposed in an equilibration chamber to place the blood in the state in which it exists in the body, said deoxygenating gas mixture next introduced in and mixed with said flow of blood, said flowing blood equilibrated in a first one of said equilibration tubes, said gas having an increasing oxygen gradient next introduced in and mixed with said flow of blood, said flowing blood equilibrated in a second one of said equilibration tubes;

a colorimetric means for determining instantaneous oxygen content connected to said apparatus; and means for separating the gaseous and liquid portions of said blood;

said colorimetric means including means for introducing an oxygen reagent into said gaseous and liquid portions;

said gaseous and liquid portions diverted individually to said colorimetric means to determine instantaneously the oxygen tension surrounding the blood and the oxygen content of the blood, said oxygenating gas mixture next introduced in and mixed with said flowing blood sample;

said flowing blood equilibrated in said first of said equilibration tubes, said gas having a decreasing oxygen gradient next introduced in and mixed with said flow of blood, said flow of blood equilibrated in said second one of said equilibration tubes, the gaseous and liquid portions of said blood separated and diverted to said colorimetric means for instantaneous determination of oxygen tension and oxygen content, whereby data necessary to determine the oxygen association and dissociation curves of a sample of blood may be obtained in a single flow process in a matter of minutes.

12. The apparatus as defined in claim 11 wherein said linear gradient generator means includes a pair of syringes having respective plungers adapted for reciprocating movement therein:

valve means having means for alternately connecting at least two gas inlets to respective ones of said syringes and for interconnecting said syringes;

means for controlling the combined operation of said valve means and the reciprocating movement of said syringes; and means connecting one of said syringes to said means for maintaining a confined flow of blood, whereby said deoxygenating gas mixture is first admitted into one of said syringes through one of said inlets and said valve means, and said oxygenating gas mixture is thereafter admitted into the other of said syringes through said other inlet and said valve means, said plungers operating simultaneously to create a gas gradient by forcing the contents of one syringe into the other syringe and the mixed contents of the other syringe into said flow of blood.

13. The apparatus as defined in claim 12 wherein said oxygen reagent is indigo carmine; and optical means for determining successively and instantaneously the quantity of oxygen in instantaneous portions of said flowing blood.

14. The apparatus as defined in claim 13 wherein said deoxygenating gas mixture is a mixture comprising nitrogen gas and said means for introducing into the flow of blood is a juncture of tubing disposed a selected distance from respective equilibration chambers.

15. The apparatus as defined in claim 13 wherein said oxygenating gas mixture is a mixture of air and said means for introducing into the flow of blood is a juncture of tubing disposed a selected distance from respective equilibration chambers.

16. Means for processing in stages in continuous flow samples of blood to determine the oxyhemoglobin association and dissociation curves thereof and other properties comprising:

means for initiating and maintaining a confined flow of blood from said samples through a series of stages in said processing means;

means for alternately deoxygenating and oxygenating said blood at selected stages in said processing means;

means for generating at least two separate gas mixtures each having a linearly changing concentration with time;

means for mixing said gas mixtures and said blood samples at selected stages in said processing means;

means for producing optimum equilibration conditions of foaming, and regulation of temperature and pressure in said flow of blood subsequent to mixing said gas mixture therewith; and means for determining the substantially instantaneous concentration of oxygen in said flow of blood at selected stages of said processing means.

17. The processing means as defined in claim 16 wherein said stages are in order deoxygenation and linearly increasing oxygenation, and complete oxygenation and linearly decreasing oxygenation.

18. The processing means as defined in claim 17 wherein said means for simulating body conditions include equilibration chambers of selective length and diameter to promote foaming and stabilize pressure, said chambers disposed in an enclosure whose temperature is maintained at substantially 37° C.

19. The processing means as defined in claim 18 wherein said means for alternately deoxygenating and oxygenating the flow of blood include at least two gas sources and means for mixing the gas from said sources with the flow of blood at selected stages in said processing means.

20. The processing means as defined in claim 19 wherein said means for generating two gas mixtures of linearly changing concentration is connected to said two gas sources, said linearly changing concentrations being the mixture obtained by linearly combining a volume of one gas mixture with an equal volume of the other gas mixture.

21. The processing means as defined in claim 19 wherein equilibration chambers are disposed immediately succeeding the points of introduction of individual gas mixtures and linearly changing gas concentrations into said flow of blood.

22. The processing means as defined in claim 21 wherein said flow of blood is first deoxygenated by mixing therewith nitrogen gas.

23. The processing means as defined in claim 22 wherein said deoxygenated flow of blood is linearly oxygenated by mixing therewith a linearly increasing concentration of a gas mixture comprising substantially air.

24. The processing means as defined in claim 23 wherein said flow of blood is fully oxygenated by mixing therewith an air mixture comprising substantially air.

25. The processing means as defined in claim 24 wherein said fully oxygenated flow of blood is linearly deoxygenated by mixing therewith a linearly increasing concentration of a gas mixture comprising substantially nitrogen gas.

26. The processing means as defined in claim 25 wherein the oxygen content of said flow of blood is continuously determined during the stages of linear oxygenation and linear deoxygenation and immediately subsequent to the stage of full oxygenation.

27. The processing means as defined in claim 26 wherein said means for generating two gas mixtures of linearly changing concentration includes a pair of syringes having respective plungers adapted for reciprocating movement therein;

valve means having means for alternately connecting at least two gas inlets to respective ones of said syringes and for interconnecting said syringes;

means for controlling the combined operation of said valve means and the reciprocating movement of said syringes; and means connecting one of said syringes to said means for maintaining a confined flow of blood, whereby said deoxygenating gas mixture is first admitted into one of said syringes through one of said inlets and said valve means, and said oxygenating gas mixture is thereafter admitted into the other of said syringes through said other inlet and said valve means, said plungers operating simultaneously to create a gas gradient by forcing the contents of one syringe into the other syringe and the mixed contents of the other syringe into said flow of blood.

28. The processing means as defined in claim 27 wherein said means for controlling the combined operation of said valve means and the reciprocating movement of said syringes includes a motor connected to said valve means;

cam means connected to said motor;

reciprocating means connected to said plungers; and switch means operable by said cam means and said reciprocating means so that said syringes may be connected to respective ones of said gas inlets through said valve means during travel of said plungers in one direction and to each other or to different ones of said gas inlets during travel in the reverse direction.

29. The processing means as defined in claim 28 wherein said valve means is a rotary valve having two stationary outer members and a rotatable inner member;

passages in one of said outer members to which said gas inlets are connected;

passages in the other of said outer members to which said syringes and a preparation line are connected, said passages in said outer members communicating with the interior surfaces thereof;

said rotatable inner member positioned in sealed relationship between said outer members, said inner member having grooves on its surface adjoining said outer members of selective contour and length and passages therethrough connecting selected grooves so that said syringes may be connected to alternate ones of said gas inlets and to each other by selective rotation of said inner member.

30. The processing means as defined in claim 29 wherein the outlets of the passages in said one of said outer members are radially disposed with respect to one another, and the grooves on the adjoining surface of said inner member are circular and in register with respective outlets, the outlets of the passages in said other of said outer members symmetrically disposed with respect to the transverse axis thereof, and symmetrically disposed arcuate grooves on the adjoining surface of said inner member in register with said outlets of said outer member, an additional groove on said inner member surface adjoining said other outer member whose ends communicate with said passage outlets in said other outer member;

a diagonal passage through said inner member connecting the inner of said circular grooves and the adjacent one of said arcuate grooves; and a transverse passage through said inner member connecting the outer of said circular grooves and the other of said arcuate grooves.

31. The processing means as defined in claim 30 wherein said rotatable inner member is made of teflon;

a positioning and sealing ring disposed about said inner member and secured to one of said outer members;

means securing both outer members and said ring together to preclude movement thereof during rotation of said inner member; and means axially connecting said inner member and said cam means to transfer rotary movement of said cam means to said inner member, said outer members and said ring made of lucite.

* * * * *